(12) United States Patent
Lin et al.

(10) Patent No.: US 7,748,974 B2
(45) Date of Patent: Jul. 6, 2010

(54) MOLDING MACHINE

(75) Inventors: Ping-Jung Lin, Tainan Hsien (TW);
Po-Hung Lin, Tainan Hsien (TW);
Po-Hang Lin, Tainan Hsien (TW)

(73) Assignee: Jih Huang Machinery Industrial Co., Ltd., Yongkang, Tainan County (TW)

( * ) Notice: Subject to any disclaimer, the term of this patent is extended or adjusted under 35 U.S.C. 154(b) by 446 days.

(21) Appl. No.: 11/939,809

(22) Filed: Nov. 14, 2007

(65) Prior Publication Data

US 2009/0121116 A1 May 14, 2009

(51) Int. Cl.
*B29C 49/56* (2006.01)
(52) U.S. Cl. .................. 425/451; 425/451.2; 425/451.7; 425/541
(58) Field of Classification Search .................. 425/451, 425/451.2, 451.7, 532, 541
See application file for complete search history.

(56) References Cited

U.S. PATENT DOCUMENTS

| | | | | |
|---|---|---|---|---|
| 4,249,880 A | * | 2/1981 | Wohlrab | .................. 425/451.2 |
| 4,865,537 A | * | 9/1989 | Shima | ........................ 425/451 |
| 6,805,827 B2 | * | 10/2004 | Kami et al. | .............. 425/451.7 |
| 2001/0048954 A1 | * | 12/2001 | Tamaki et al. | ............ 425/451.7 |

* cited by examiner

*Primary Examiner*—Robert B Davis
(74) *Attorney, Agent, or Firm*—Kauth, Pomeroy, Peck & Bailey LLP

(57) ABSTRACT

Molding machines and methods of performing molding processes are described. One embodiment includes a base, a carriage disposed movably on the base, a first mold secured immovably to the carriage, a second mold disposed slidably on the carriage, a driving unit for moving the second mold on the carriage and toward and away from the first mold, a push shaft inserted telescopically into a pressure cylinder and pushing the second mold against the first mold, a synchronous transmission unit for moving said carriage synchronously with the second mold so that the first mold is moved to said second mold, and a pressure booster including a booster tube, and a telescopic booster rod extendable into the booster tube to transfer pressure in the booster tube to the pressure cylinder so as to boost the pressure inside the pressure cylinder.

5 Claims, 8 Drawing Sheets

US 7,748,974 B2

MOLDING MACHINE

BACKGROUND OF THE INVENTION

1. Field of the Invention

The invention relates to a molding machine, for molding products, such as containers.

2. Description of the Related Art

As shown in FIG. 1, a conventional blow molding machine 1 includes opposite first and second molds 12, 13 disposed to a base (not shown), and a push unit 14 disposed to the base for pushing the second mold 13 against the first mold 12. The push unit 14 includes a hydraulic motor 141 disposed to said base, a support 142 disposed to the base and spaced apart from the hydraulic motor 141, and a linkage mechanism 143 having levers 144 connected pivotally and respectively to the second mold 13, the hydraulic motor 141, and the support 142. When using the conventional molding machine 1, the hydraulic motor 141 drives the linkage mechanism 143, thereby pushing the second mold 13 to move toward and eventually to couple with the first mold 12.

However, since each of the levers 144 of the linkage mechanism 143 has a fixed length, the displacement of the second mold 13 is fixed. Wear and deformation of the levers 144 may change the displacement of the second mold 13 and reduce the coupling strength between the first and second molds 12, 13, thereby affecting the quality of the container products. In addition, the coupling strength between the first and second molds 12, 13 may decrease due to an oil leakage of the hydraulic motor 141 of the push unit 14.

SUMMARY OF THE INVENTION

Therefore, the object of the present invention is to provide a molding machine that can produce high pushing force to push mold parts against each other.

One embodiment of the invention includes a base, a carriage disposed movably on the base, a first mold secured immovably to the carriage, a second mold disposed slidably on the carriage for moving toward or away from the first mold, a driving unit including a driver, and a driving screw rotated by the driver, attached rotatably to the carriage and connected drivingly to the second mold, a synchronous transmission unit connected to the second mold and the carriage for moving the carriage synchronously with the second mold so that the first mold is moved along with the carriage to contact the second mold, and a push unit including a pressure cylinder. The push shaft is inserted telescopically into the pressure cylinder and has a piston, first and second cylinder chambers disposed in the pressure cylinder on two sides of the piston, and a passage tube connected to the second cylinder chamber. The push shaft extends outwardly through the second cylinder chamber and is connected to the second mold for pushing the second mold against the first mold. In a further embodiment, the molding machine further includes a pressure booster including a booster tube, a booster actuator, and a booster rod connected telescopically to the booster actuator to move into or out of the booster tube so as to transfer pressure in the booster tube to the first cylinder chamber, and a valve mechanism having a valve casing connected fluidly to the first and second cylinder chambers, the passage tube, and the booster tube, and a check valve disposed in the valve casing to control fluid communication among the first and second cylinder chambers, the passage tube, and the booster tube.

BRIEF DESCRIPTION OF THE DRAWINGS

Other features and advantages of the present invention will become apparent in the following detailed description with reference to the accompanying drawings, of which.

DETAILED DESCRIPTION OF THE PREFERRED EMBODIMENT

Figure 1:
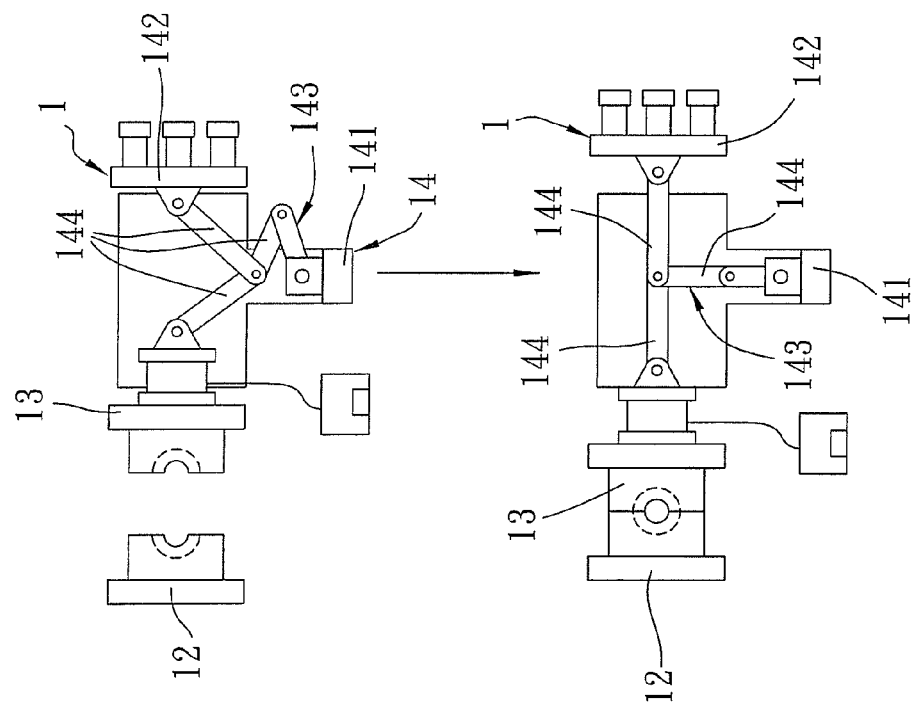
FIG. 1 is a schematic side view of a conventional molding machine, illustrating how a second mold is coupled to a first mold.
Figure 2:
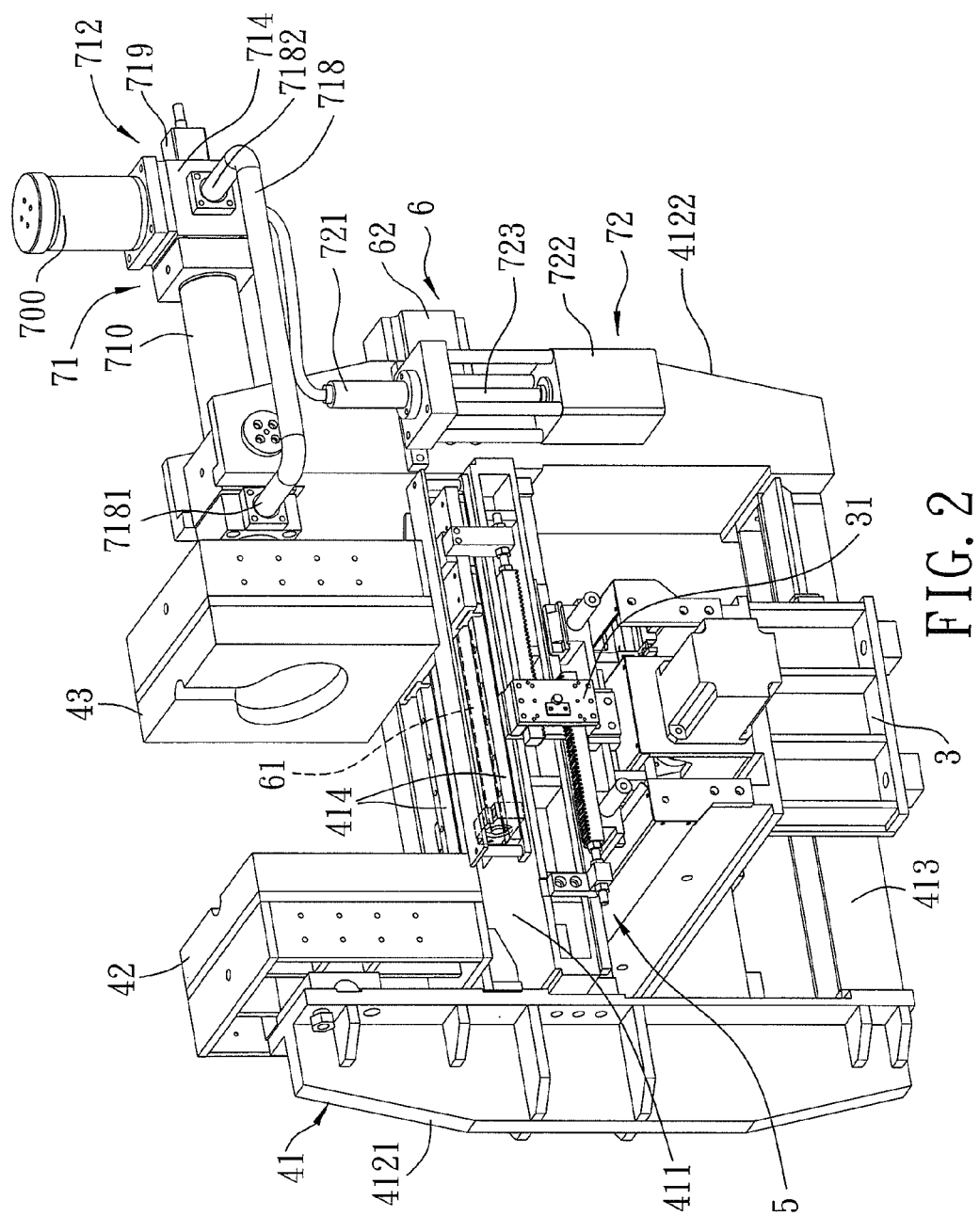
FIG. 2 is an assembled perspective view of a molding machine according to an embodiment of the invention.
Figure 3:
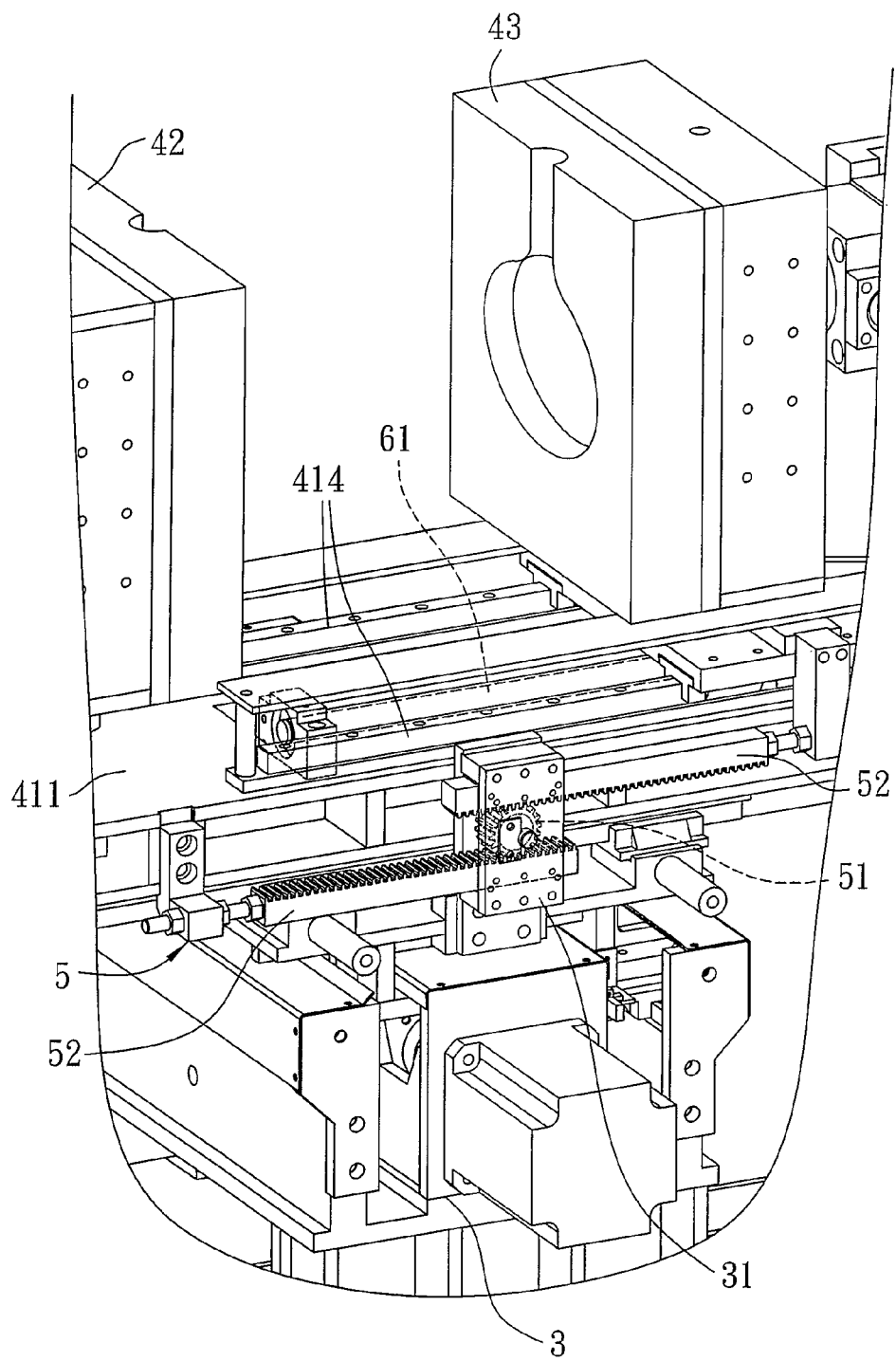
FIG. 3 is an enlarged fragmentary perspective view of a molding machine according to an embodiment of the invention, illustrating a synchronous transmission unit.
Figure 4:
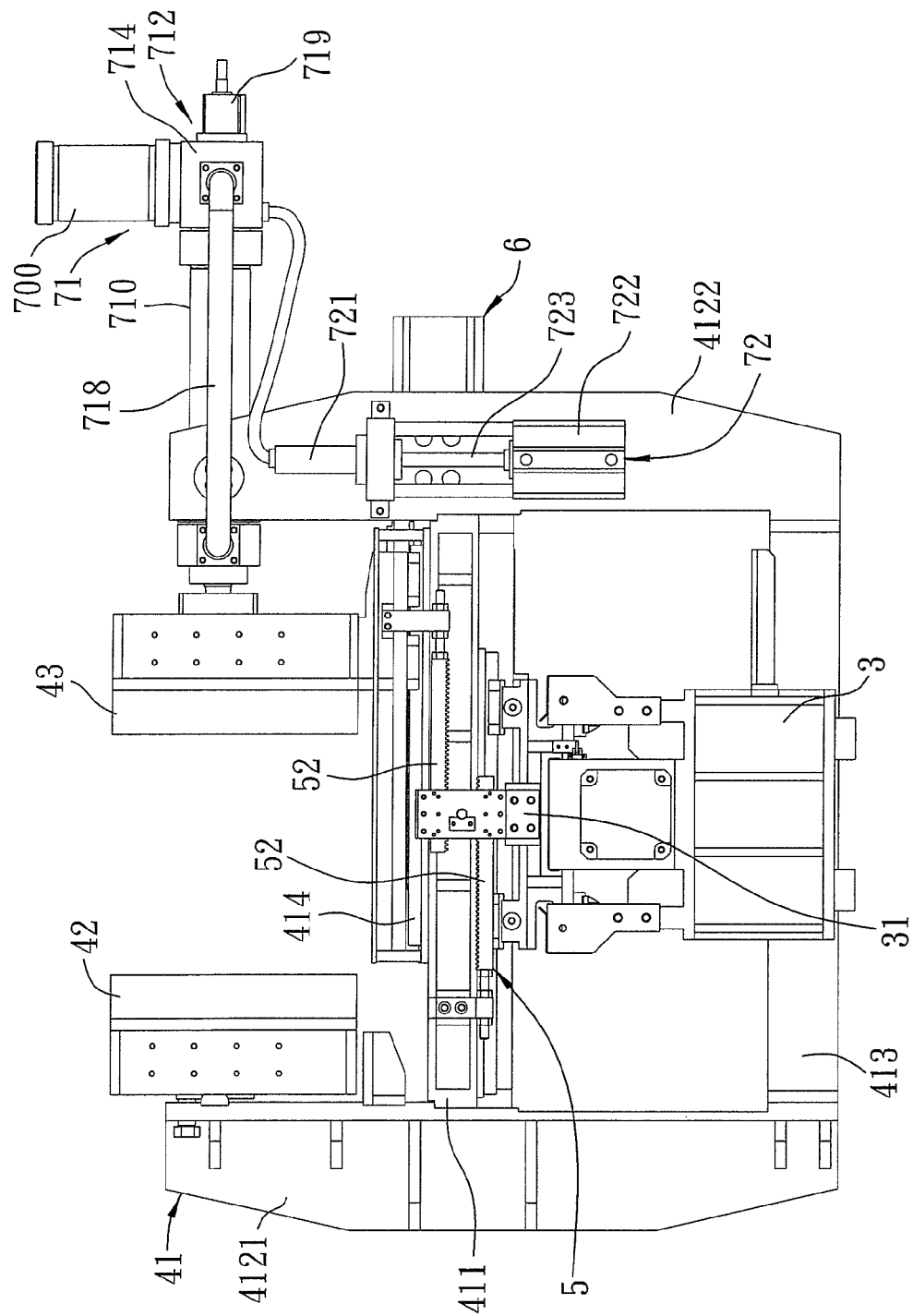
FIG. 4 is a side view of a molding machine according to an embodiment of the invention at a state which a second mold is separated from a second mold.

Turning now to the drawings, molding machines according to embodiments of the present invention adapted for forming containers are shown. In FIGS. 2 to 4, the molding machines include and comprises a base 3 including a retaining component 31 disposed thereon, a carriage 41 disposed on the base 3, a first mold 42, a second mold 43, a synchronous transmission unit 5, a driving unit 6, a push unit 71, and a pressure booster 72 connected to the push unit 71.

The first mold 42 is secured immovably to the carriage 41. The second mold 43 is disposed slidably on the carriage 41 for moving toward or away from the first mold 42, and can be coupled to the first mold 42 to confine a molding space (not shown). The carriage 41 includes a movable seat 411 that is movable substantially horizontally on the base 3 and that carries the first and second molds 41, 42, a pair of sliding rails 414 that are spaced apart from each other, that are disposed substantially horizontally on the movable seat 411, and on which the second molds 42 slides, first and second upright supports 4121, 4122 that are connected respectively to two ends of the movable seat 411, and a lower support 413 that interconnects bottom ends of the upright supports 4121, 4122 below the movable seat 411.

In this embodiment, the synchronous transmission unit 5 includes a gear 51 disposed rotatably in the retaining component 31 of the base 3, and a pair of substantially horizontal gear racks 52 connected respectively to the movable seat 411 of the carriage 41 and the second mold 43 and meshing with the gear 51 at two diametrically opposite positions to thereby move in opposite directions. Specifically, one of the gear racks 52 has a left end fixed to a left side of the movable seat 411, and a right end extending into the retaining component 31 of the base 3 and meshing with a bottom side of the gear 51.

The other one of the gear racks 52 has a right end fixed to a bottom end of the second mold 43 and a left end extending into the retaining component 31 and meshing with a top side of the gear 51. Therefore, the synchronous transmission unit 5 can move the movable seat 411 synchronously with the second mold 43 so that the first mold 42 is moved along with the carriage 41 to contact the second mold 43.

The driving unit 6 includes a horizontal driving screw 61 attached rotatably to the movable seat 411 of the carriage 41 and connected drivingly the second mold 43, and a driver 62 for rotating the driver 61 so as to move the second mold 43 on the carriage 41 and toward or away from the first mold 42. In this embodiment, the driver 62 is a servo-motor and is mounted on the second upright support 4122 of the carriage 41. The driving screw 61 is a ball screw in this embodiment that extends through the second upright support 4122 of the carriage 41 in a right-to-left direction, and has a left end portion that is mounted rotatably on the movable seat 411. The bottom end of the second mold 43 engages the driving screw 61. When the driving screw 61 is rotated by the driver 62, the second mold 43 is moved leftwardly and rightwardly.

Figure 5:
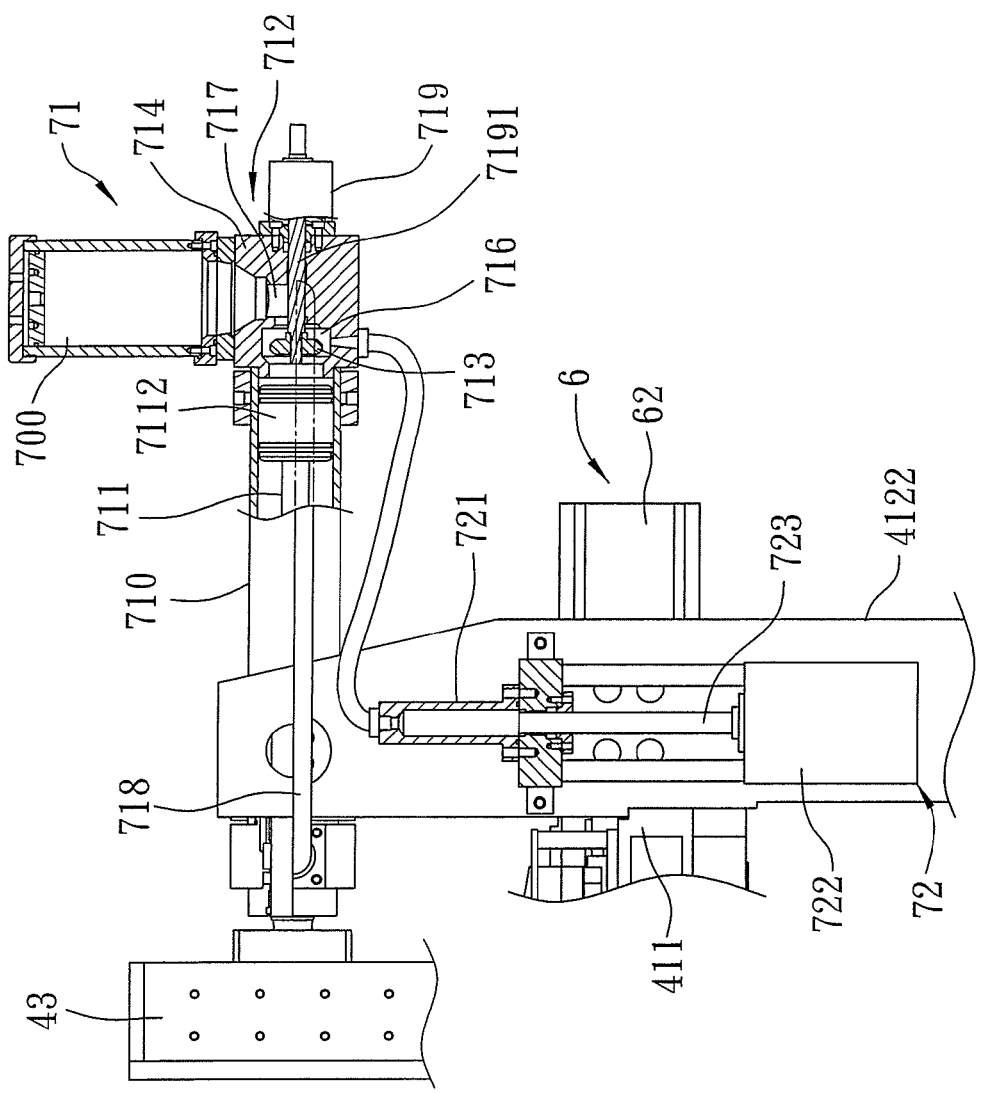
FIG. 5 is an enlarged fragmentary, and partly sectional view of a molding machine in accordance with an embodiment of the invention, illustrating a push unit and a pressure booster.
Figure 6:
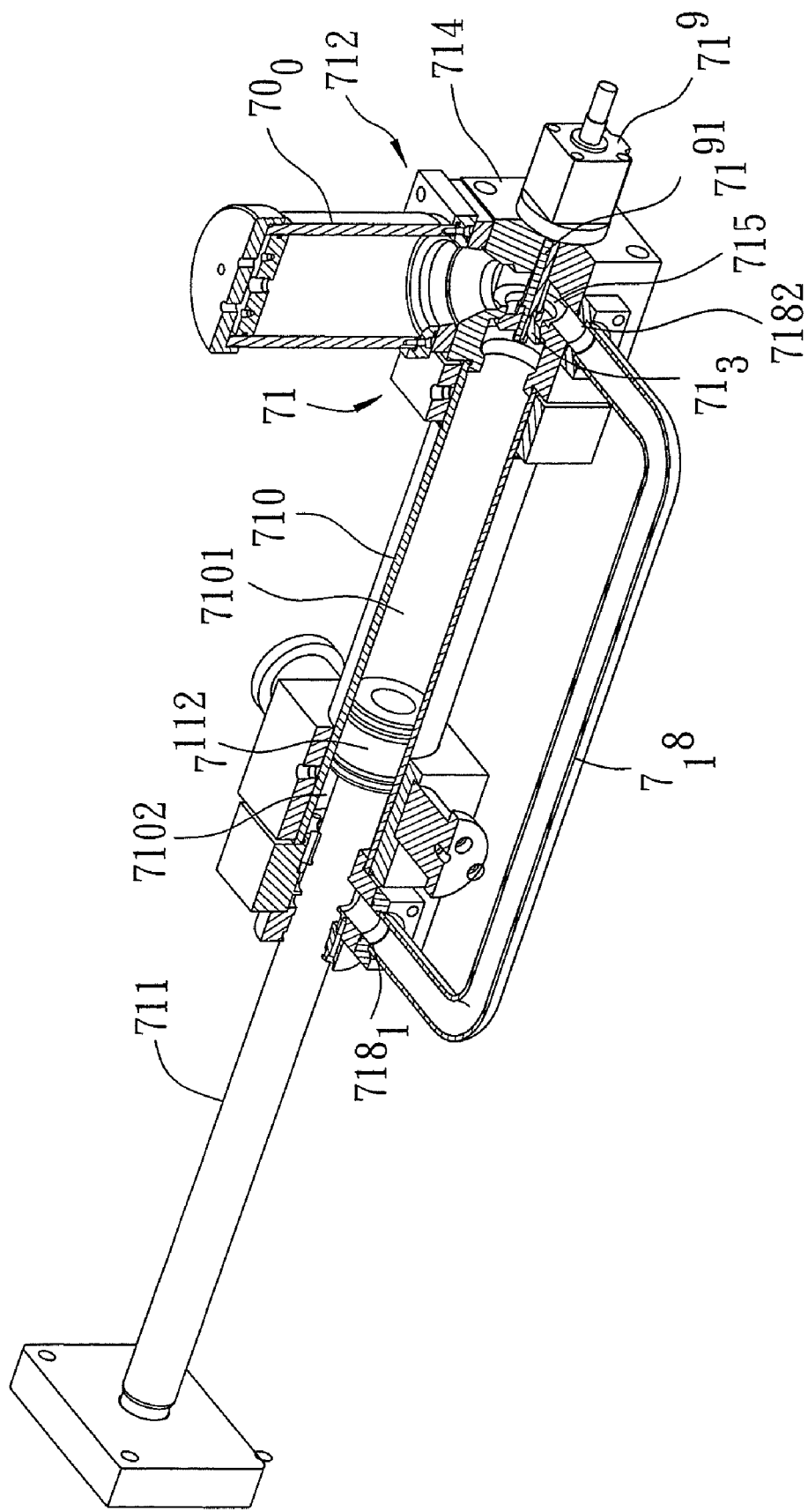
FIG. 6 is a perspective partly cutaway view of the push unit of a molding machine in accordance with an embodiment of the invention.
Figure 7:
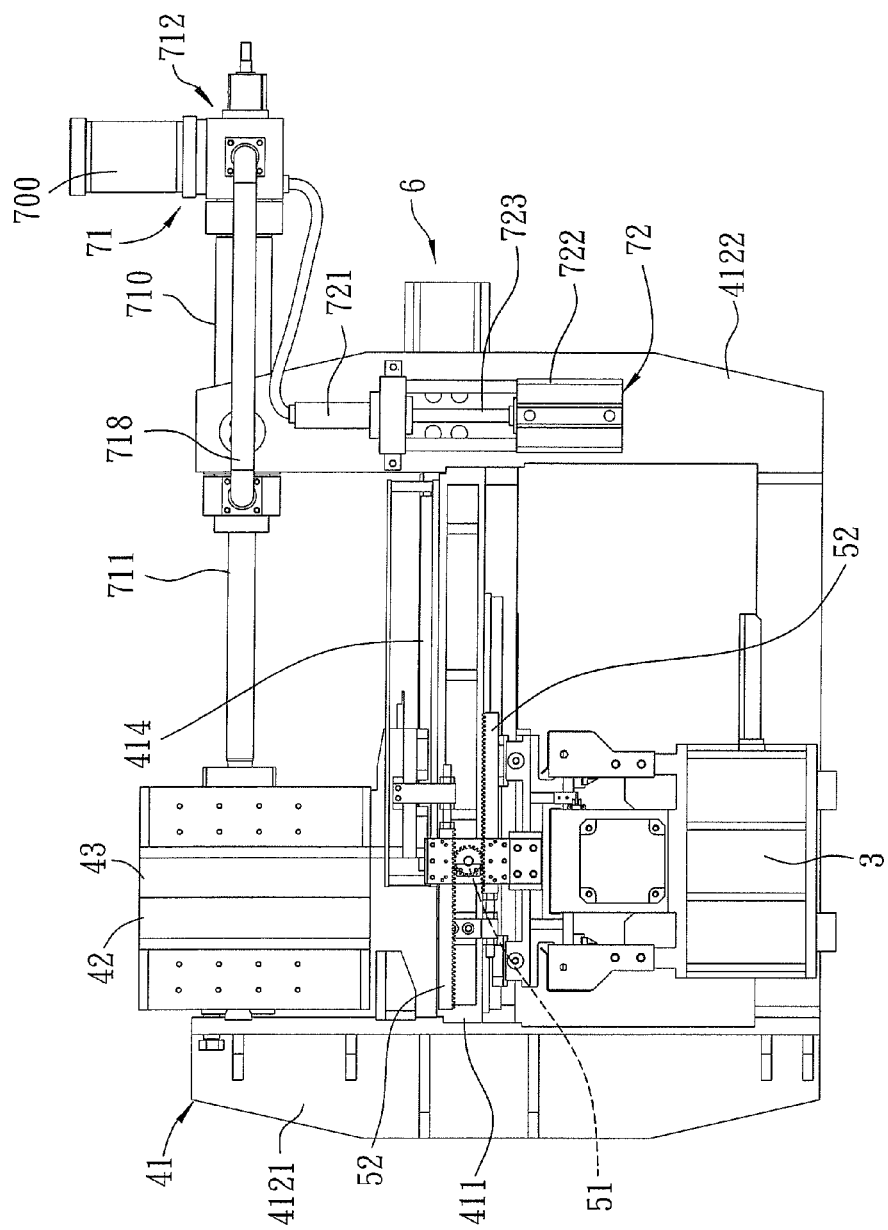
FIG. 7 is a view similar to FIG. 4, but illustrating the second mold that is moved to the first mold.
Figure 8:
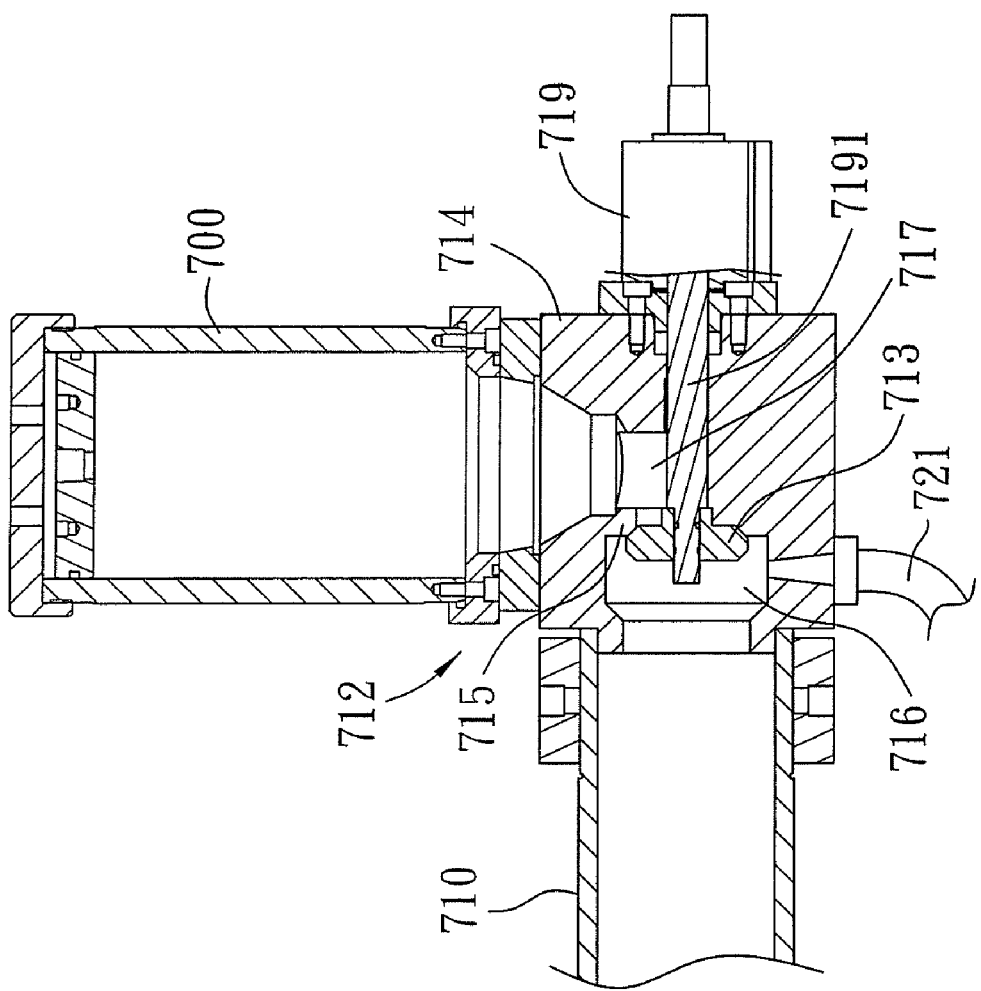
FIG. 8 is an enlarger fragmentary, and partly sectional view of a molding machine in accordance with an embodiment of the invention illustrating a valve mechanism of the push unit.

As shown in FIGS. 2, 5, and 6, in this embodiment, the push unit 71 includes a pressure cylinder 710 mounted on the second upright support 4122 over the driver 62 of the driving unit 6, and a push shaft 711 inserted telescopically into the pressure cylinder 710 for pushing the second mold 43 against the first mold 42 after said second mold 43 contacts said first mold 42. The push shaft 711 has a piston 7112 connected to the push shaft 711 and disposed movably within the pressure cylinder 710. The pressure cylinder 710 has a first cylinder chamber 7101 and a second cylinder chamber 7102 on two sides of the piston 7112 of the push shaft 711. The push shaft 711 extends outwardly through the second cylinder chamber 7102, and connected to the second mold 43. The pressure cylinder 710 further has a passage tube 718 having first and second ends 7181, 7182. The first end 7181 is connected fluidly to the second cylinder chamber 7102.

A valve mechanism 712 includes a valve casing 714 connected fluidly to the first and second cylinder chambers 7101, 7102, the passage tube 718, and the booster tube 721, and a check valve 713 disposed in the valve casing 714 to control fluid communication among the first and second cylinder chambers 7101, 7102, the passage tube 718, and the booster tube 721. The valve casing 714 includes first and second valve chambers 716, 717, a valve seat 715 between the first and second valve chambers 716, 717. The check valve 713 is seated on the valve seat 715. A pneumatic valve actuator 719 having a telescopic actuator rod 7191 is connected to the check valve 713 to move the check valve 713 toward or away from the valve seat 715. The first valve chamber 716 is connected to the first cylinder chamber 7101, and the second valve chamber 717 is connected to the passage tube 718. In this embodiment, the push unit 71 further includes a fluid reservoir 700 that has an open end connected to the valve casing 714 so as to communicate fluidly with the second valve chamber 717.

The pressure booster 72 includes a booster tube 721 that is disposed to the second upright support 4122 of the carriage 41, and that is connected fluidly to the first cylinder chamber 7101 through the first valve chamber 716, a pneumatic booster actuator 722 secured to the second upright support 4122 of the carriage 41, and a telescopic booster rod 723 that is connected telescopically to the pneumatic booster actuator 722 to move into or out of the booster tube 721. The booster rod 723 transfers pressure in the booster tube 721 to the first cylinder chamber 7101 when moving into the booster tube 721.

In this embodiment, both of the valve actuator 719 and the pneumatic booster actuator 722 are pneumatic actuators and are connected to an air compressor (not shown). In addition, the driver 62, the valve actuator 719 and the pneumatic booster actuator 722 are connected electrically to a console device (not shown), and are controlled by the console device via a control program. Moreover, hydraulic oil is provided in the pressure cylinder 710, the valve casing 714 and the fluid reservoir 700.

As shown in FIGS. 2, 3, 6, 7, and 8, when the molding machine of the invention starts to work, the check valve 713 is driven by the valve actuator 719 via the actuator rod 7191 to move away from the valve seat 715, thereby resulting in a fluid communication among the first cylinder chamber 7101, the first and second valve chambers 716, 717, the passage tube 718 and the booster tube 721. Then, the driving screw 61 is rotated by the driver 62, thereby moving the second mold 43 toward the first mold 42 along the sliding rails 414. At the same time, the movement of the second mold 43 actuates a relative movement between the gear racks 52 via the engagement between the gear racks 52 and the gear 51 such that the first mold 42 is moved synchronously along with the carriage 41 to move toward the second mold 43.

When the second mold 43 is moved toward the first mold 42, the push shaft 711 connected to the second mold 43 is gradually drawn out of the pressure cylinder 710 so that the hydraulic oil in the second cylinder chamber 7102 is forced by the piston 7112 to flow into the passage tube 718, and eventually flows into the first and second valve chambers 716, 717. The fluid in the fluid reservoir 700 also flows into the first and second valve chambers 716, 717 and then to the first cylinder chamber 7101, thereby pushing the second mold 43 against the first mold 42.

When the second mold 43 is coupled to the first mold 42, the driver 62 is controlled to stop immediately. Subsequently, the check valve 713 is driven by the valve actuator 719 via the actuator rod 7191 to move reversely so that of the check valve 713 is seated again on the valve seat 715. Therefore, the first and the second valve chambers 716, 717 are disconnected fluidly from each other.

Afterward, the booster actuator 722 is activated to actuate the booster rod 723 to extend into the booster tube 721, thereby forcing the hydraulic oil in the booster tube 721 to flow into the first cylinder chamber 7101 through the first valve chamber 716. As the pressure of the hydraulic oil in the booster tube 721 is transferred to the first cylinder chamber 7101, the pressure inside the pressure cylinder 710 is increased, thereby causing the second mold 43 to abut more tightly against the first mold 42.

When the molding process is completed, the valve actuator 719 is activated once again to move the check valve 713 away from the valve seat 715 via the actuator rod 7191 to permit fluid communication between the first and the second valve chamber 716, 717. Then, the driver 62 is activated again to rotate and to move the second mold 43 away from the first mold 42. At this time, through the synchronous transmission unit 5, the first mold 42 is moved away from the second mold 43, and the push shaft 711 that is connected to the second mold 43 gradually extends into the pressure cylinder 710, such that a part of hydraulic oil in the first cylinder chamber 7101 is forced by the piston 7112 to flow back to the fluid reservoir 700. Another part of the hydraulic oil flows into the passage tube 718, and eventually flows into the second cylinder chamber 7102.

Compared to the prior art, by virtue of the synchronous transmission unit 5 and the driving unit 6 of many embodiments of the invention, the first and second molds 42, 43 can move toward each other for coupling together, and the push unit 71 and the pressure booster 72 provide a high pushing force to abut the first and second molds 42, 43 tightly against each other, thereby enabling a better quality for forming products. In addition, since the second mold 43 is driven by an electrical driver 62, rather than by a hydraulic power, the drawbacks associated with oil leaks can be effectively eliminated.

It should be noted that, the push unit 71 and the pressure booster 72 may be mounted directly to the movable seat 411 of the carriage 4 or the base 3 rather than on the second upright support 4122 as an alternative. Moreover, while in many embodiments, the fluid reservoir 700 is disposed for receiving fluid, the present invention should not be limited thereto. For example, the volumes of the first and second valve chamber 716, 717 can be enlarged to receive an amount of fluid as large as that contained in the fluid reservoir 700. Furthermore, the check valve 713, the valve actuator 719, and the actuator rod 7191 may be dispensed with, if the pressure booster 72 can sufficiently pressurize the first and second valve chambers 716, 717 in the valve casing 714.

While the present invention has been described in connection with a number of specific embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A molding machine comprising:
  a base;
  a carriage disposed movably on said base;
  a first mold secured immovably to said carriage;
  a second mold disposed slidably on said carriage for moving toward or away from said first mold;
  a driving unit including a driver and a driving screw rotated by said driver, said driving screw being attached rotatably to said carriage and connected drivingly to said second mold;
  a synchronous transmission unit connected to said second mold and said carriage for moving said carriage synchronously with said second mold so that said first mold is moved along with said carriage to contact said second mold;
  a push unit including a pressure cylinder, a push shaft inserted telescopically into said pressure cylinder and having a piston, first and second cylinder chambers disposed in said pressure cylinder on two sides of said piston, and a passage tube connected to said second cylinder chamber, said push shaft extending outwardly through said second cylinder chamber and connected to said second mold for pushing said second mold against said first mold;
  a pressure booster including a booster tube, a booster actuator, and a booster rod connected telescopically to said booster actuator to move into or out of said booster tube so as to transfer pressure in said booster tube to said first cylinder chamber; and
  a valve mechanism having a valve casing connected fluidly to said first and second cylinder chambers, said passage tube, and said booster tube, and a check valve disposed in said valve casing to control fluid communication among said first and second cylinder chambers, said passage tube, and said booster tube.

2. The molding machine as claimed in claim 1, wherein said valve mechanism further includes a valve actuator, and an actuator rod connected telescopically to said valve actuator and said check valve.

3. The molding machine as claimed in claim 2, wherein said valve casing includes a first valve chamber connected fluidly to said first cylinder chamber and said booster tube, a second valve chamber connected fluidly to said passage tube, and a valve seat between said first and second valve chambers, said check valve being seated movably on said valve seat.

4. The molding machine as claimed in claim 1, wherein said synchronous transmission unit includes a gear disposed rotatably to said base, and a pair of substantially horizontal gear racks that are connected respectively to said carriage and said second mold and that mesh with said gear at two diametrically opposite positions to thereby move in opposite directions, said carriage including a movable seat movable substantially horizontally on said base and carrying said first and second molds, and a sliding rail disposed substantially horizontally on said movable seat, said second mold being mounted slidably on said sliding rail.

5. The molding machine as claimed in claim 4, wherein said carriage further includes first and second upright supports connected respectively to two ends of said movable seat, and a lower support interconnecting bottom ends of said upright supports below said movable seat, said driver and said push unit being mounted on said second upright support.

* * * * *